US009056701B1

(12) United States Patent
Haibel et al.

(10) Patent No.: US 9,056,701 B1
(45) Date of Patent: Jun. 16, 2015

(54) TOOL-LESS CLOSURE

(71) Applicant: Sypris Technologies, Inc., Louisville, KY (US)

(72) Inventors: Joshua A. Haibel, Louisville, KY (US); William L. Schmidt, Leitchfield, KY (US)

(73) Assignee: Sypris Technologies, Inc., Louisville, KY (US)

( * ) Notice: Subject to any disclaimer, the term of this patent is extended or adjusted under 35 U.S.C. 154(b) by 58 days.

(21) Appl. No.: 13/800,608

(22) Filed: Mar. 13, 2013

Related U.S. Application Data

(63) Continuation-in-part of application No. 13/477,788, filed on May 22, 2012, now Pat. No. 8,596,484.

(51) Int. Cl.
| | |
|---|---|
| *B65D 45/28* | (2006.01) |
| *F16J 13/10* | (2006.01) |
| *F16J 13/16* | (2006.01) |
| *F16J 13/18* | (2006.01) |

(52) U.S. Cl.
CPC .............. *B65D 45/28* (2013.01); *F16J 13/10* (2013.01); *F16J 13/16* (2013.01); *F16J 13/18* (2013.01)

(58) Field of Classification Search
CPC ............. F16J 13/10; F16J 13/16; F16J 13/18; F16J 13/20; F16J 13/22
USPC .......... 220/262, 315, 320, 321, 323, 810, 833
See application file for complete search history.

(56) References Cited

U.S. PATENT DOCUMENTS

| | | | |
|---|---|---|---|
| 1,339,905 | A | 5/1920 | O'Connor |
| 2,040,024 | A | 5/1936 | Roberts |
| 2,158,218 | A | 5/1939 | Brouhon |
| 2,180,606 | A | 11/1939 | Oys et al. |
| 2,558,220 | A | 6/1951 | McLachlan |
| 2,616,587 | A | 11/1952 | Petch |
| 2,721,094 | A | 10/1955 | Webster |
| 3,042,248 | A | 7/1962 | Krueger |
| 3,114,561 | A | 12/1963 | Creath et al. |
| 3,285,615 | A | 11/1966 | Trbovich |
| 3,449,860 | A | 6/1969 | Franks, Jr. et al. |
| 3,539,212 | A | 11/1970 | Poltorak |
| 3,635,499 | A | 1/1972 | Reddy |
| 3,667,649 | A | 6/1972 | Thillet |
| 3,690,682 | A | 9/1972 | Ferrill |
| 3,960,395 | A | 6/1976 | Cirule et al. |
| 4,102,474 | A | 7/1978 | Platts |
| 4,140,240 | A | 2/1979 | Platts |

(Continued)

FOREIGN PATENT DOCUMENTS

GB 2214994 2/1988

OTHER PUBLICATIONS

Pipeline Equipment, Inc., Twinlock Closure; Sales Brochure; undated, pp. 1-2; Pipeline Equipment, Inc., Tulsa, OK, USA.

*Primary Examiner* — Jeffrey Allen
*Assistant Examiner* — Madison L Poos
(74) *Attorney, Agent, or Firm* — Middleton Reutlinger

(57) ABSTRACT

A closure comprises a hub with a central opening and a head positionable within the hub, the head sealing the central opening when in a closed position, a spool rotatable about a post extending from the head, wherein rotation of the spool causes axial movement of the spool along the post, a plurality of radial arms extending from the spool to a plurality of locking segments.

22 Claims, 11 Drawing Sheets

(56) References Cited

U.S. PATENT DOCUMENTS

| | | | |
|---|---|---|---|
| 4,152,871 A | 5/1979 | Kardash, Jr. | |
| 4,222,147 A | 9/1980 | Burnett, Jr. | |
| 4,307,818 A * | 12/1981 | Singh et al. | 220/316 |
| 4,315,577 A | 2/1982 | Bernson, Jr. | |
| 4,339,843 A | 7/1982 | Burnett, Jr. | |
| 4,387,740 A | 6/1983 | Vanzant | |
| 4,422,651 A | 12/1983 | Platts | |
| 4,515,287 A | 5/1985 | Baudoux et al. | |
| 4,519,519 A * | 5/1985 | Meuschke et al. | 220/211 |
| 4,627,763 A | 12/1986 | Roemer et al. | |
| 4,693,278 A | 9/1987 | Wilson et al. | |
| 4,815,163 A | 3/1989 | Simmons | |
| 4,815,627 A | 3/1989 | Marshall | |
| 4,883,637 A | 11/1989 | McDaniels, Jr. | |
| 4,920,609 A | 5/1990 | Lin | |
| 5,035,321 A | 7/1991 | Denton | |
| 5,127,535 A | 7/1992 | Shinno | |
| 5,207,398 A | 5/1993 | Veaux et al. | |
| 5,700,043 A | 12/1997 | Rohard et al. | |
| 5,743,575 A | 4/1998 | McFarland | |
| 6,095,365 A * | 8/2000 | Yielding | 220/264 |
| 6,116,610 A | 9/2000 | Goldswain et al. | |
| 6,200,123 B1 | 3/2001 | Mailliet et al. | |
| 6,224,058 B1 | 5/2001 | Drebing et al. | |
| 6,286,553 B1 | 9/2001 | Morgan | |
| 6,293,051 B1 | 9/2001 | Matye | |
| 6,325,101 B1 | 12/2001 | Stoll et al. | |
| 6,439,415 B1 | 8/2002 | Salim et al. | |
| 6,786,670 B2 | 9/2004 | Smith | |
| 6,837,498 B2 | 1/2005 | Fluck et al. | |
| 6,857,536 B2 | 2/2005 | Smith | |
| 7,036,674 B2 | 5/2006 | McGuire | |
| 7,051,897 B2 | 5/2006 | McGuire | |
| 7,118,472 B2 | 10/2006 | Kennedy et al. | |
| 7,341,161 B2 | 3/2008 | McGuire | |
| 7,373,951 B2 | 5/2008 | Gossett et al. | |
| 7,669,730 B2 | 3/2010 | Lopez | |
| 7,681,594 B2 | 3/2010 | Gossett et al. | |
| 7,850,751 B2 * | 12/2010 | Steiner | 55/385.1 |
| 8,251,373 B2 | 8/2012 | Lev et al. | |
| 2009/0260290 A1 | 10/2009 | McQuaid et al. | |

* cited by examiner

TOOL-LESS CLOSURE

CROSS-REFERENCE TO RELATED DOCUMENTS

This Application claims priority to and is a continuation-in-part under 35 U.S.C. §120 of U.S. patent application Ser. No. 13/477,788 filed May 22, 2012 and entitled "Tool-Less Closure", which is incorporated herein by reference.

BACKGROUND OF THE INVENTION

1. Field of the Invention

Present embodiments relate generally to a closure or a pressure vessel or pipe. More specifically present embodiments relate to a closure mechanism for locking or unlocking a closure for a pressure vessel or pipe system.

2. Description of the Related Art

Closures for pressure vessels and pipes typically utilize a round door or head adapted to fit in the aperture of a body or hub. The hub is connected to a vessel or pipe system or other structure which is typically pressurized. The door or head is lockingly engaged to the hub when in the closed position so that the system or vessel may be pressurized without unknowingly allowing for opening of the head from the hub.

A bore or aperture of the hub has an inner circumferential groove for supporting a portion of a locking member. The door has a locking ring proximate a circumferential portion of an outer surface of the door wherein the locking ring is engaged to cooperate with the groove about the aperture after the door is closed and seated in the aperture. These locking members are typically biased by a band or ring which is caused to expand or contract, causing the same expansion or contraction of the locking ring to lock or unlock the door from the hub.

One problem with known closure structures is being able to apply enough force to an opening handle or other linkage structure to open or release a locking ring which engages the head with the circumferential groove of the hub.

It would be desirable to have a system which utilizes a known minimal range of motion for a handle to which a suitable amount of force may be applied comfortably by the user in order to release a locking ring while still providing a safe system which will not disengage inadvertently while the system is pressurized.

SUMMARY OF THE INVENTION

According to some embodiments, a closure for pressurized system or aperture comprises a hub having a generally cylindrical shape with a central opening and a head which is operably connected to the hub and is movable between a first closed position sealing the central opening and a second open position, a central post extending from the head, a spool having a plurality of arms extending from the spool, the spool rotatably positioned about the post, the radial arms pivotally connected to the spool and pivotally connected to a locking ring segment, the locking ring having a recess for pivotally receiving the radial arm, a guide having at least two pieces, one of the two guide pieces disposed on the locking ring segment, the other of the two guide pieces disposed on the head, and, the spool and the post operably engaged wherein pivotal motion of the spool causes the spool to move axially along the post. The closure further comprises a pin extending through the post. The closure further comprises a spline on one of a bushing or spool engaging the pin. The closure further wherein one of the spool and the post has a thread and the other of the spool and the post has a cooperating feature. The closure further comprises a pin extending from a spool and engaging a spline in the central post. The closure wherein one of the two guide pieces is a key and the other of said two guide pieces is a keyway. The closure of wherein the key and the keyway constrain the locking ring segment to radial movement. The closure wherein the head has a tapered surface near a radially outward edge. The closure wherein the locking ring segments move axially. The closure further comprising a fastener aperture on a flat surface of the head. The closure further comprises a fastener aperture on the tapered surface of the head. The closure further comprises a cover plate positioned to cover the spool and the radial arms. The closure further comprises a handle connected to the cover plate.

According to some embodiments, a closure for a pressurized system or aperture, comprises a hub having a central opening and a head hingedly connected to the hub, a post extending from the head and a spool movably positioned on the post, the spool rotatably movable on the post and movable axially along the post toward or away from the head, a plurality of radial arms having a first end and a second end, the radial arms extending radially in a first position and non-radially in a second position, a plurality of locking segments positioned on the head for slidable movement along the head, the plurality of locking segments being positioned radially extended in the first position and radially retracted in the second position, the spool moving a preselected axial distance between the first position and the second position. The closure wherein the locking segments have one of a key and a keyway and the head has the other of a key and a keyway. The closure further comprises a cover plate over the spool and the radial arms. The closure wherein said cover plate is movable in the axial direction of the post. The closure further comprises a spline on one of the spool or the post. The closure wherein the spline is variable pitch. The closure wherein the spline is one of continuous or discontinuous.

According to some embodiments, a closure comprises a hub with a central opening and a head pivotally connected to the hub, the head sealing the central opening when in a closed position, a spool rotatable about a post extending from the head, wherein rotation of the spool causes axial movement of the spool along the post, a plurality of radial arms extending from the spool to a plurality of locking segments.

According to other embodiments, a closure for pressurized system or vessel comprises a hub having a generally cylindrical shape with a central opening, a head positionable within the central opening of the hub and removable from the central opening of the hub, a davit operably engaging the head to at least one of lift and lower the head from within the central opening, a central post extending from the head, a spool having a plurality of arms extending from the spool, the spool rotatably positioned about the post, the radial arms pivotally connected to the spool and pivotally connected to a locking ring segment, the locking ring having a recess for pivotally receiving the radial arm, the spool and the post operably engaged wherein pivotal motion of the spool causes the spool to move axially along the post. The closure further comprises a pin extending through the post. The closure further comprises a spline on one of a bushing or spool engaging the pin. The closure wherein one of the spool and the post has a thread and the other of the spool and the post has a cooperating feature. The closure further comprising a pin extending from a spool and engaging a spline in the central post. The closure wherein a guide having at least two pieces, one of the two guide pieces is disposed on the locking ring segment, the other of the two guide pieces is disposed on the head. The closure wherein one of the two guide pieces is a key and the other of the two guide pieces is a keyway. The closure wherein the key and the keyway constrains the locking ring segment to radial movement. The closure wherein the head has a tapered surface near a radially outward edge. The closure wherein the locking ring segments move axially. The closure further comprises a fastener aperture on a flat surface of the head. The closure further comprising a fastener aperture on the tapered surface of the head. The closure further comprising a cover plate connected to the spool wherein pivoting of the cover plate causes rotation of the spool. The closure further comprising a handle connected to the cover plate.

According to still other embodiments, a closure for a pressurized system or aperture comprises a hub having a central opening and a head positionable within the central opening of the hub, a post extending from the head and a spool movably positioned on the post, the spool rotatably movable on the post and movable axially along the post toward or away from the head, a plurality of radial arms having a first end and a second end, the radial arms extending radially in a first position and non-radially in a second position, a plurality of locking segments positioned on the head for slidable guided movement along the head, the plurality of locking segments being positioned radially extended in the first position and radially retracted in the second position, the spool rotating with rotational movement of a cover plate, rotation of the spool causing the spool to move a preselected axial distance between the first position and the second position. The closure wherein the locking segments having one of a key and a keyway. The closure wherein the head having the other of a key and a keyway. The closure further comprising a cover plate over the spool and the radial arms. The closure wherein the cover plate is movable in the axial direction of the post. The closure further comprising a spline on one of the spool or the post. The closure wherein the spline has variable pitch. The closure wherein the spline is one of continuous or discontinuous.

According to still further embodiments, a closure comprising, a hub with a central opening and a head moveable into or out of the hub, the head sealing the central opening when in a closed position, a davit connected to the head to one of lift or lower the head relative to the central opening of the hub, a spool rotatable about a post extending from the head, wherein rotation of the spool causes axial movement of the spool along the post, a cover plate engaging the spool wherein rotation of the cover plate causes rotation of the spool, a plurality of radial arms extending from the spool to a plurality of locking segments, a said locking segments being guided to move along the head to engage or disengage the hub.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE FIGURES

Embodiments, which may be preferred and exemplary, together with further objects and advantages thereof, are more particularly described in the following detailed description taken in conjunction with the accompanying drawings, in which.

DETAILED DESCRIPTION

Figure 1:
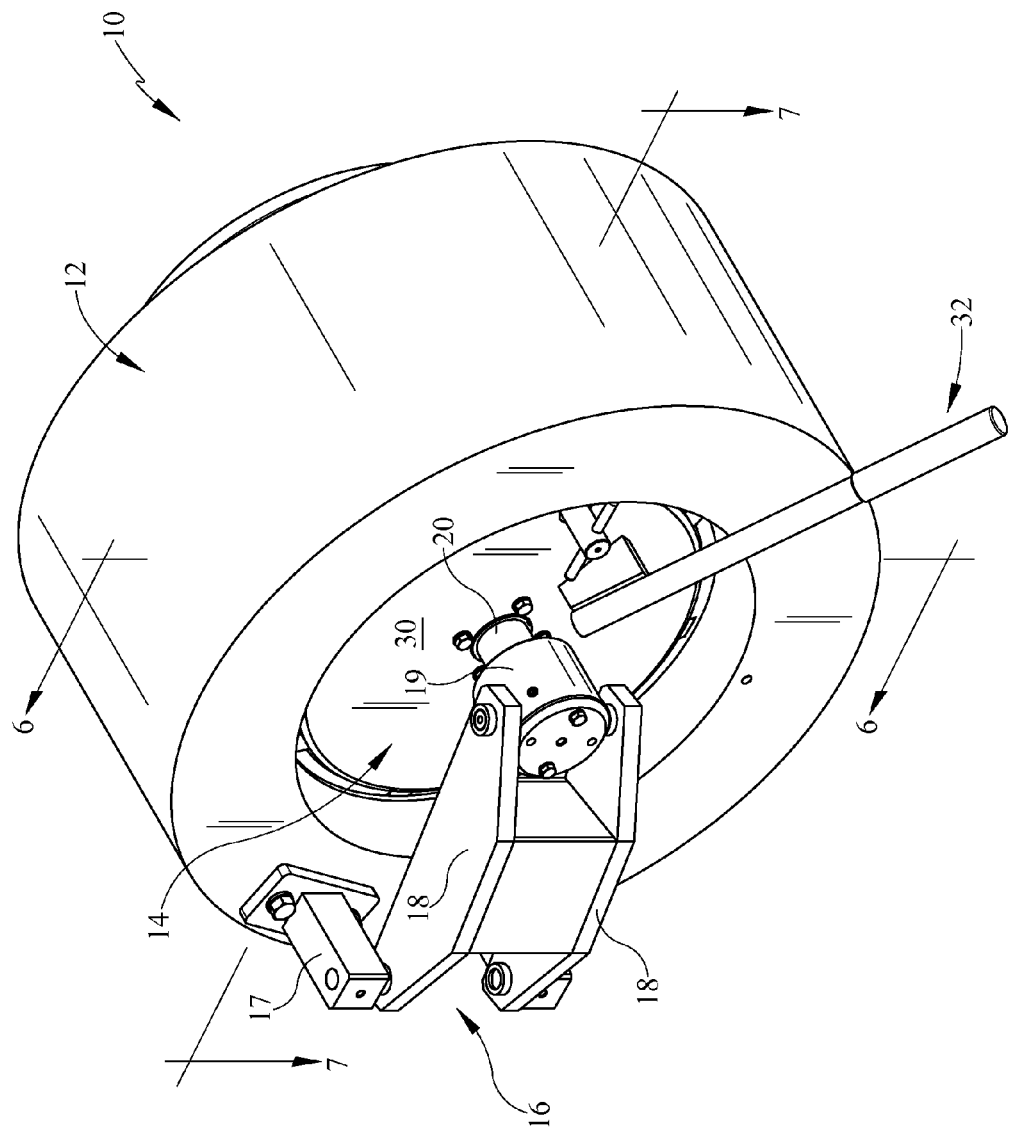
FIG. 1 is a perspective view of a closure in a closed position.

It is to be understood that the exemplary embodiments are not limited in their application to the details of construction and the arrangement of components set forth in the following description or illustrated in the drawings. The exemplary embodiments are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify various embodiments and that other alternative mechanical configurations are possible.

As referred to herein, the term axially means in the direction of the axis of the hub 12. Also, the term radially refers to the direction of a radius, for example from the axis of the hub toward the outer circumference thereof, or vice-versa.

Referring to FIGS. 1-13, a tool-less closure is depicted having a spool structure for opening and closing a pressurized vessel or system. The tool-less closure structure allows for rotational movement to radially expand or contract a locking ring segment structure. The radial expansion or contraction causes engagement or disengagement between a head and a hub defining enclosure.

Referring initially to FIG. 1, the closure 10 is depicted as an exemplary embodiment. The closure 10 comprises a hub 12 and a head 14 which is pivotally connected to the hub 12 by hinge assembly 16. The head 14 is blocked from view in FIG. 1 by a cover plate 30. The hub 12 is annular in shape with a central bore 13 (FIG. 2) and a circumferential groove 21 therein. The hub 12 is weldable to the pressure vessel or other system, such as a tank, pipeline, or enclosure subjected to pressure differential.

The closure 10 allows access to the pressure vessel or other system by way of the openable head 14. The head 14 is shown having a circular shape which fits within the bore 13 of the hub 12. The hinge assembly 16 allows the head 14 to move from the closed position found in FIG. 1 to an open position shown in FIG. 2. In such open position the head allows access to a pipe or pressure vessel or other pressurized system (not shown) to which the closure 10 is attached. When the head 14 is in the closed position as shown in FIG. 1, the pipe system or pressure vessel to which the closure 10 is connected may be pressurized.

The hinge assembly 16 includes at least one first hinge arm 17 and a second hinge arm 18 pivotally connected to the at least one first hinge arm 17. The second hinge arm 18 is connected to a third hinge arm 19 in pivotal fashion so that a double pivoting structure is provided in order to connect the head 14 to the hub 12. The at least one first hinge arm 17 is connected to the head 14 and may be integrally connected, such as by welding, or may be a bolted connection such as shown in the figure. The second hinge arm 18 has a first end and a second end. The first end is pivotally connected to the first pivot arm 17. The second end is pivotally connected to the third pivot arm 19. These pivotal connections define a vertical pivot axis about which motion occurs.

Extending through the head 14 and through a cover plate 30 is a post 20 which connects to the third hinge arm 19. The post 20 has at least two functions. First the post 20 defines a structure about which the cover plate 30 and a spool 60 (FIG. 3) may pivot. The post 20 allows for structure to connect to the hinge assembly 16 so that the head 14 may be moved when a locking ring assembly (FIG. 3) 40 is retracted allowing interior access to the hub 12 and the pressure vessel or system.

Figure 3:
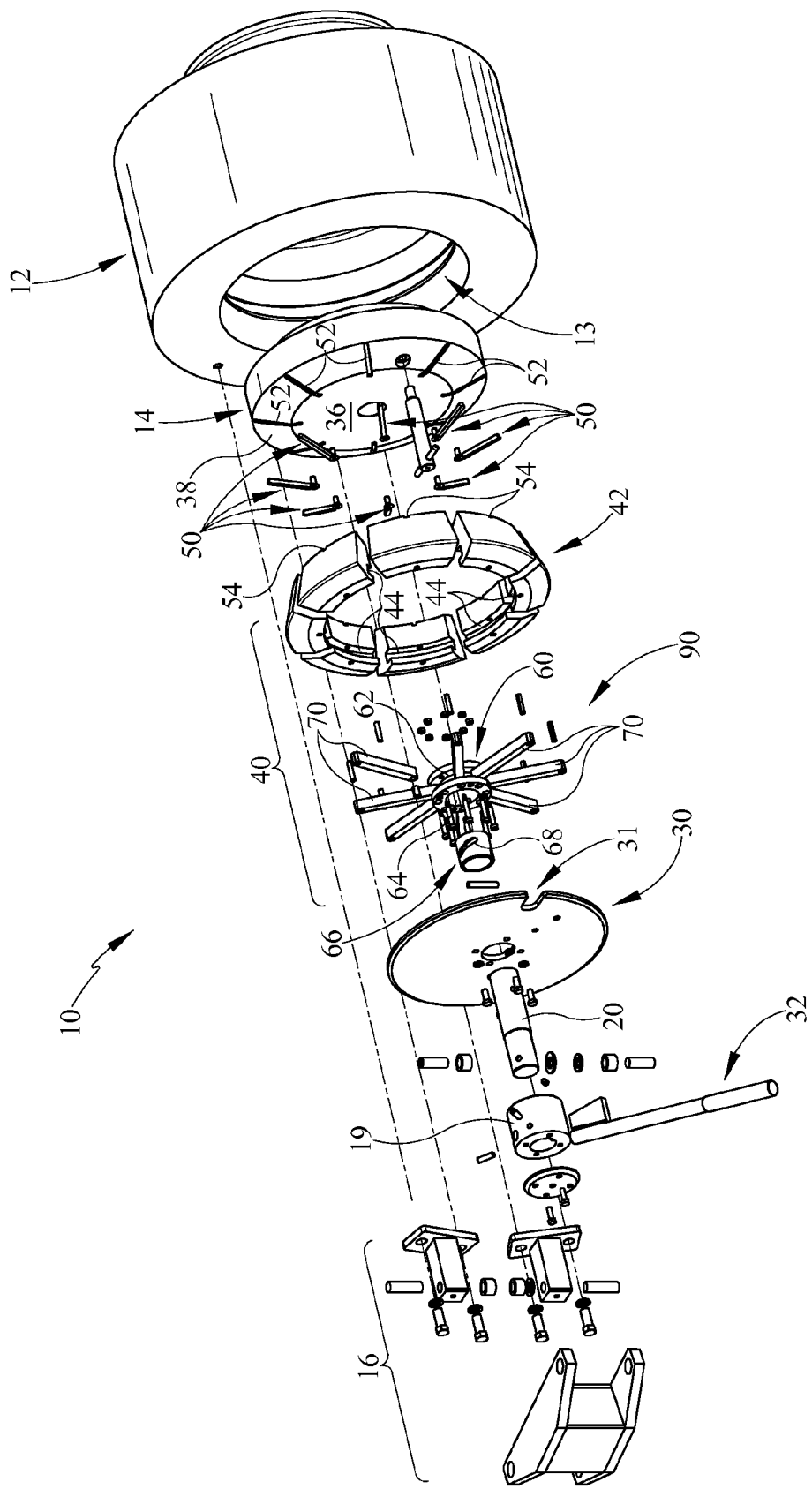
FIG. 3 is an exploded perspective view depicting the multiple components of the closure.

A cover plate 30 is disposed on the outer side of the closure adjacent the head 14. The cover plate 30 covers the components of the locking ring assembly 40 (FIG. 3). Additionally, the cover plate 30 inhibits tampering with the components of the locking ring assembly 40 and therefore has at least some functionality as a safety feature.

Also connected to the cover plate 30 is a handle 32. The handle 32 may be rotated a pre-selected arcuate distance to cause rotation of the cover plate 30 and spool assembly 60 (FIG. 3). This will cause locking or unlocking of the head 14 relative to the hub 12 which will be described further herein, by disengagement of the circumferential groove 21 within the hub 12.

Figure 2:
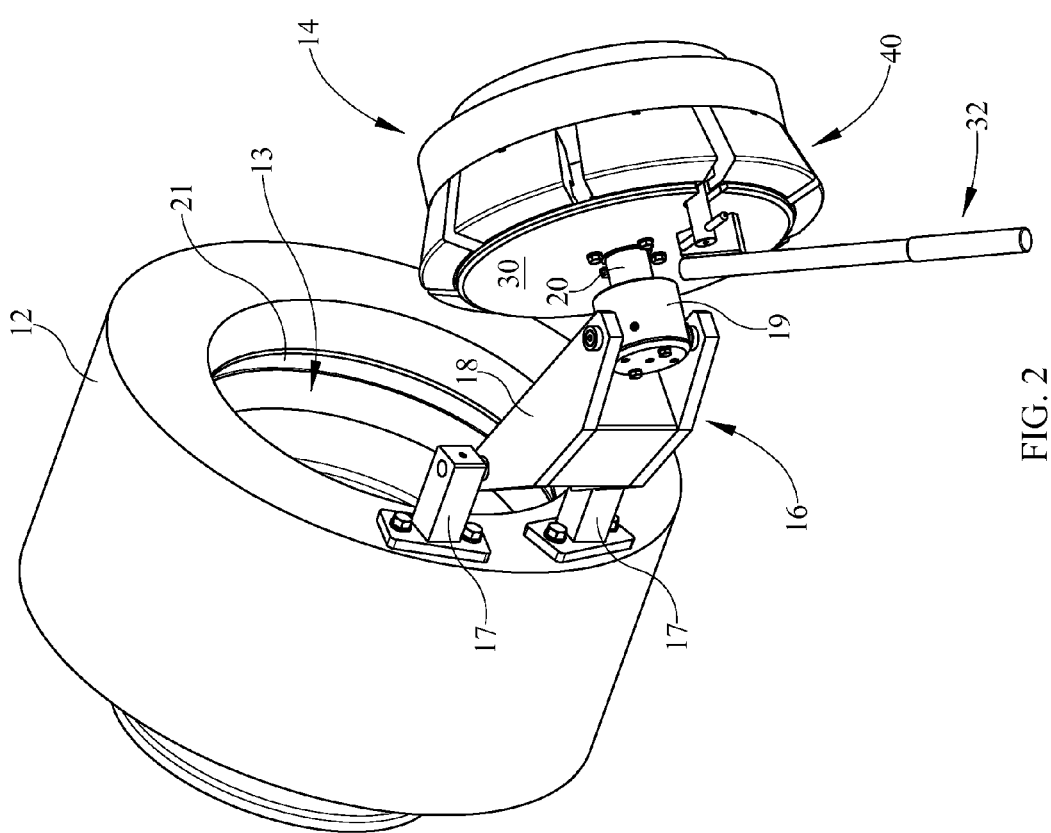
FIG. 2 is a perspective view of an exemplary closure in an open position.

Referring now to FIG. 2, a perspective view of the closure 10 is depicted with the closure 10 situated in an open position wherein the door or head 14 is pulled away from the hub 12. This allows internal access to the hub structure and pressure vessel or pressurized system after the vessel or system is depressurized. The double pivoting function of the hinge is depicted wherein the second hinge arm 18 is pivoted relative to the at least one first hinge arm 17. Additionally, the third hinge arm 19 is pivoted relative to the second hinge arm 18. Hence the double pivoting function of the hinge assembly 16. However, it should be understood that a single pivot hinge assembly may be utilized or other hinge assembly three or more pivots.

Additionally shown in FIG. 2 is the internal bore 13 of the hub 12 is shown with the head 14 removed therefrom. Also shown in the figure is the cover plate 30 mounted on the post 20, as well as the locking ring assembly 40 positioned adjacent to cover plate 30 and on the head 14. The cover plate engages a portion of the locking ring assembly 40 and sandwiches the assembly between a surface of the head 14 and a rear surface of a cover plate 30. This allows for controlled radial movement of the locking ring assembly 40 to retract or expand.

Referring now to FIG. 3, an exploded view of the closure 10 is depicted. Starting at the right hand side of the figure, the hub 12 is shown having a central bore 13 wherein the head 14 is positioned. Exploded from the hub 12, the head 14 includes a flat front surface 36 and a tapered surface 38 extending from the flat surface 36 to the radial edge of the hub 14. The tapered surface 38 provides a transition surface along which the locking ring segments 42 move in a radial direction to either engage or disengage a groove within the bore 13 of the hub 12.

The locking ring assembly 40 is defined by a plurality of locking ring segments 42, radial arms 70, and a locking ring actuator 90 formed of a rotatable axially movable spool 60 and post or other drive rod 20. The locking ring segments 42 are each arcuate and extend about an axis of the closure 10. The circumferential ends of the ring segments 42 are cut to form a substantially circular shaped assembly. The segments 42 have a polygonal cross section as best shown and described with respect to FIG. 7. Along the radially inner side of the ring segments 42 is a groove or other receiving structure wherein the radial arm 70 is received for pivoting motion therebetween.

Positioned between the locking ring segments 42 and the head 14 are a plurality of guides, which are depicted as a plurality of keys 50, slots 52 and grooves 54. Each of the keys 50 fits in a radial slot 52 extending along the tapered surface 38. The tapered slot 52 receives the keys 50 and may be of continuous depth or may be tapered. The radially inward end of the keys 50 includes a bolt or other fastener. A corresponding bolt hole is found in the head 14 allowing for fastening of the keys 50 to the head 14. The bolt holes may be on the flat surface 36 or in the tapered surface 52 at the bottom of the keyway 52. The keys 50 however may be connected by various types of fastener or alternatively may be welded to the head 14. Opposite the keys 50 are grooves 54 located on the bottom surfaces of the locking ring segments 42. The grooves 54 receive the keys 50 for motion of the segments 52 along the keys 50. Thus the keys 50 are located relative to the head 14 and segments 42 are located relative the keys 50. The locking ring segments 42 slide along the keys 50 and the keys are retained in the keyways 52 so that the keyway or groove 54 inhibits motion of the locking ring segment 42 in any direction other than that allowed by the keyway 54 and key 50. The locking ring segments 42 move axially relative to the hub 12 and head 14 in the sense that the tapered surface 38 causes a change in axial position of the locking ring segment 42. However, the radial movement of the segment 42 is the primary direction of movement radially inward or outward relative to the bore 13 of the hub 12. It should also be understood that while the keys and grooves are described on specific structures, the keys and grooves guiding radial movement of the segments 42 may be adjusted to other parts. For example, the key maybe positioned on the head or the locking ring segment. Likewise, other guides or structures maybe utilized to limit degrees of freedom in addition to those described specifically herein.

Adjacent to the locking ring segments 42 are the spool 60 and radial arms 70. The spool 60 is circular shape including a central groove 62 (see also FIG. 6) which receives a plurality of radial arms 70. The spool 60 may be formed of various shapes alternative to the circular shape shown. The radial arms 70 have a first end and a second end. The first end is connected to the spool 60 in the spool groove 62. At the first end of the radial arm 70, a pivoting connection is provided between the spool 60 and the radial arms 70 within the groove 62. The radial arm 70 pivots at the spool 60 about an axis extending parallel to the axis of the hub 12. The radial arms 70 are connected to the locking ring segments 42 at the second end within grooves 44 of the locking ring segment 42. This axis also pivots about an axis which extends parallel to the main axis of the hub 12. A pin, screw, bolt or other fastening structure is used to make the pivoting connection between the radial arm 70 and the locking ring segment 42 and the spool 60. However this description should not be considered to limit the aspects of the embodiments.

The spool 60 further includes a central bore 64 (see also FIG. 6) which is co-axial with the hub 12 and head 14 and receives a splined bushing 66 which may be of various shapes but has a central circular bore allowing pivoting on the post 20. The splined bushing 66 is received in the bore 64 and although these parts are shown in two distinct structures, they may be formed as a single piece such as by casting or other formation ends. The splined bushing 66 has a spline, thread or other groove 68 which allows for axial movement of the spool 60 during the rotation of the cover plate 30. Additionally, the spline 68 may be of a variable pitch or may be a consistent pitch and may be formed of a single groove or multiple grooves. Additionally, the spline 68 may be continuously formed or discontinuously formed as well.

The spool 60 and spline 68 which may be integrally formed or alternatively may be formed on the bushing 66, as shown. This allows for axial movement of the spool 60 during rotation thereof about the post 20. This rotational movement causes axial movement of the locking ring segment 42 along the tapered surface 38 of the head 14. Additionally, as described further herein, the locking ring segments move radially inwardly to contract or expand radially outwardly during such rotation. The rotation described is performed by movement of the handle 32 which is connected to the cover plate 30. The cover plate 30 is connected to the spool 60, causing rotation of the radial arms 70 and movement of locking segments 42 so that all of the structures rotate about the post 20, which extends from the head 14. The rotation is effected by application of force to the handle 32. Since the handle 32 is connected to the cover plate 30, the cover plate 30 rotates, in turn causing rotation of the spool 60, radial arms 70 and movement of the segments 42.

Figure 4:
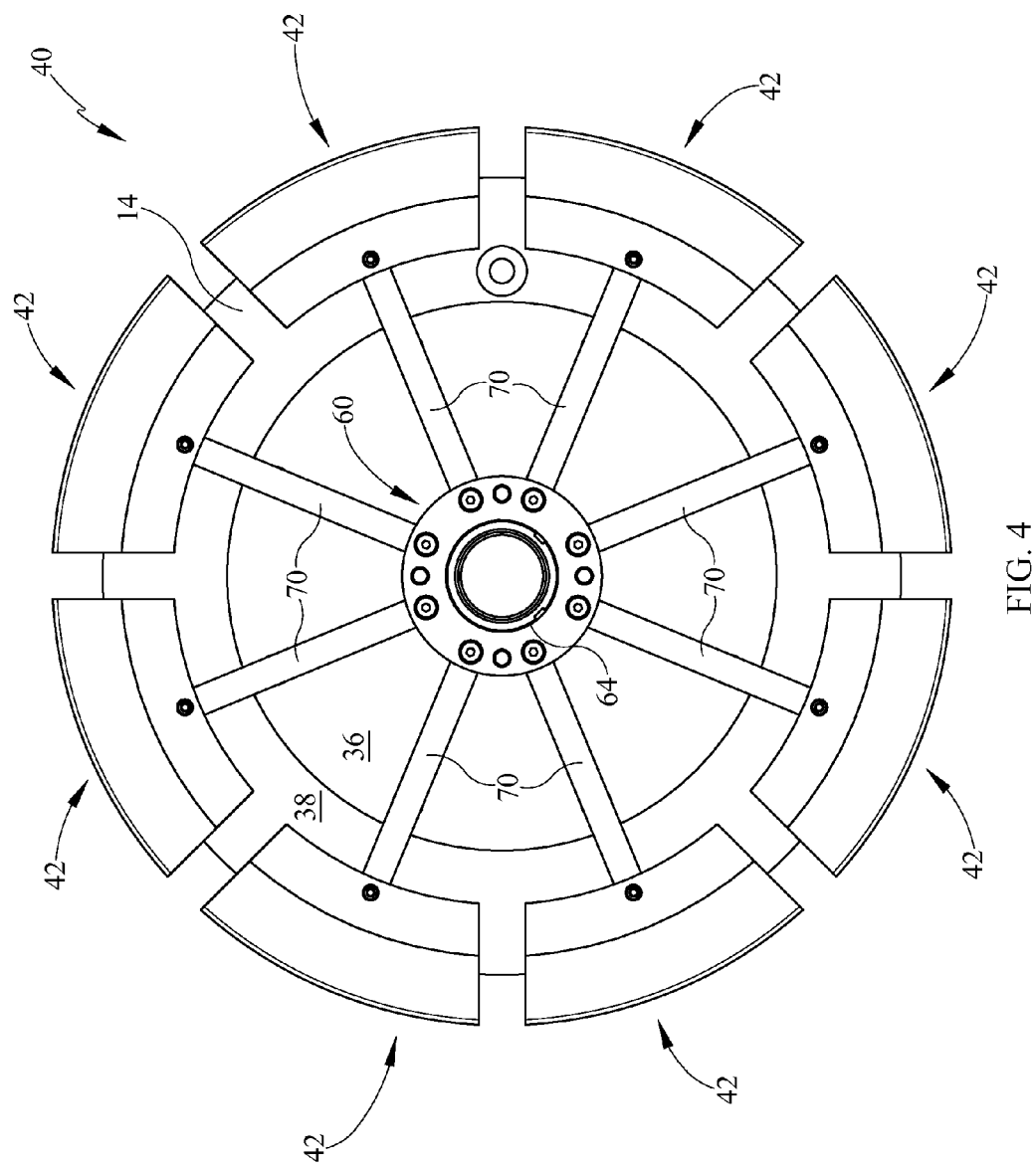
FIG. 4 is a front view of a spool and locking ring assembly in an extended position when the closure is in the closed position of FIG. 1.
Figure 5:
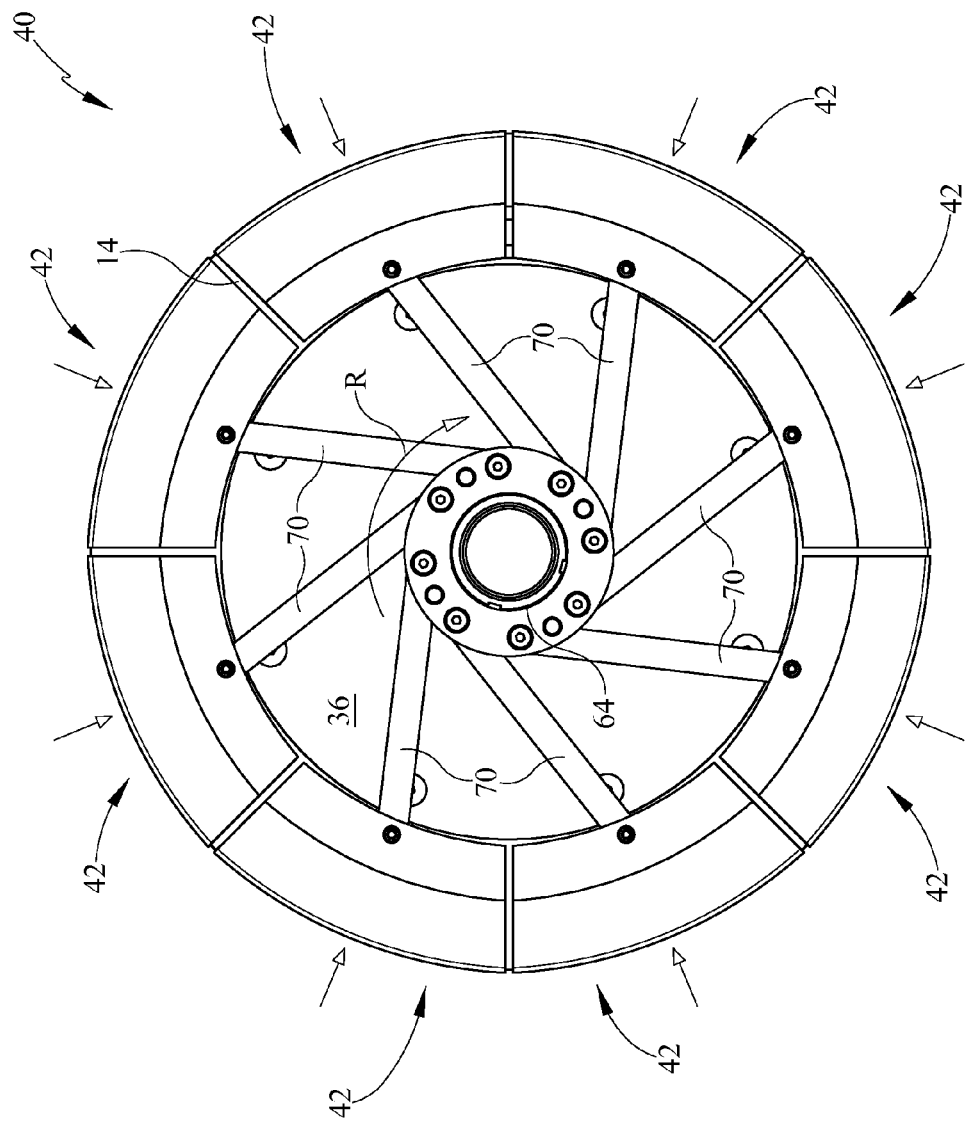
FIG. 5 is a front view of the spool and locking ring assembly wherein the locking ring segments are in the retracted position so that the closure may be opened as shown in FIG. 2.

Referring now to FIG. 4, a front view of the locking ring assembly 40 is depicted. The head 14 is shown with the tapered surface 38 and flat surface 36. Above the door 14 is the spool 60 having the plurality of radial arms 70 extending therefrom. The radial arms 70 are pivotally connected at a first end to the spool 60 and at a second end to the locking ring segment 42. In the position depicted, the locking ring segments 42 are fully extended radially outwardly so that the head 14 would be in a closed and locked position relative to the hub (not shown). In order to open the head 14, and with reference to FIG. 5, the spool 60 is rotated in the direction R by providing a radial force on the handle 32 (FIG. 3). With this rotational force causing rotation is of the spool 60, the arms 70 move with the rotation of the spool 60 and cause radial contraction of the locking ring segments 42. As shown in FIG. 5, the segments 42 have moved inwardly from their position shown in FIG. 4. In such position, the segments are radially inwardly positioned and disengaged from the hub 12 so that the head 14 may be opened to the position shown in FIG. 2.

Figure 6:
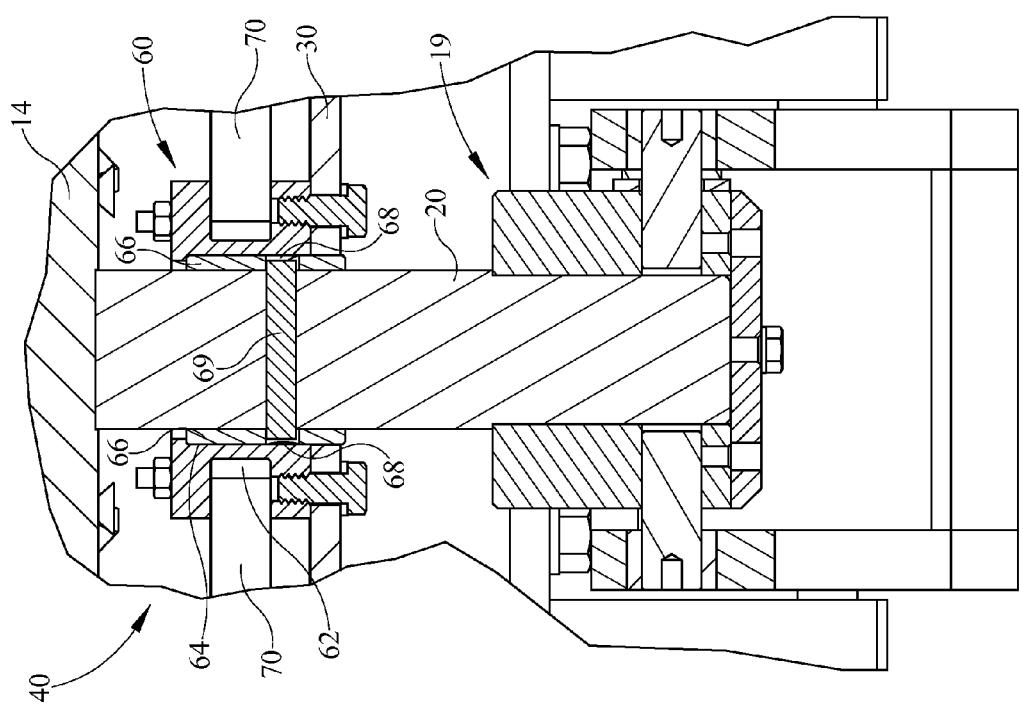
FIG. 6 is a sectional view of a locking ring actuator including the post and spool structure.

Referring now to FIG. 6, a section view of the locking ring assembly 40 is shown. The spool 60 is rotatably positioned on the post 20 at an end of the post 20 near the head 14. At an opposite end of the post 20 is a third hinge arm 19 which locates the hinge assembly 16. The spool 60 includes the radial arms 70 pivotally connected thereto and radially extending therefrom. The splined bushing 66 is positioned within the bushing bore 64 although the splined bushing 66 may be integrally formed with the spool 60 in alternative embodiments. The spline 68 receives a pin 69 extending through the post 20. The ends of the pin 69 are fixed so that rotation of the spool 60 results in a controlled axial movement of the spool 60 along the post 20. The spline 68 may be constant pitch, variable pitch, continuous, discontinuous, or various combinations thereof. Alternatively, the post 20 could utilize a groove and a pin, rib or protuberance extending from the spool 60 to engage the groove and cause the desired axial movement with rotation. In either embodiment, with such axial movement of the spool 60, the locking ring segment 42 moves axially along the tapered surface 38 (FIG. 3), as well as radially inward and outward relative to the hub 12. Thus during rotation of spool 60, the spool moves axially as the segments 42 change axial position as they move along the tapered surface 38.

Figure 7:
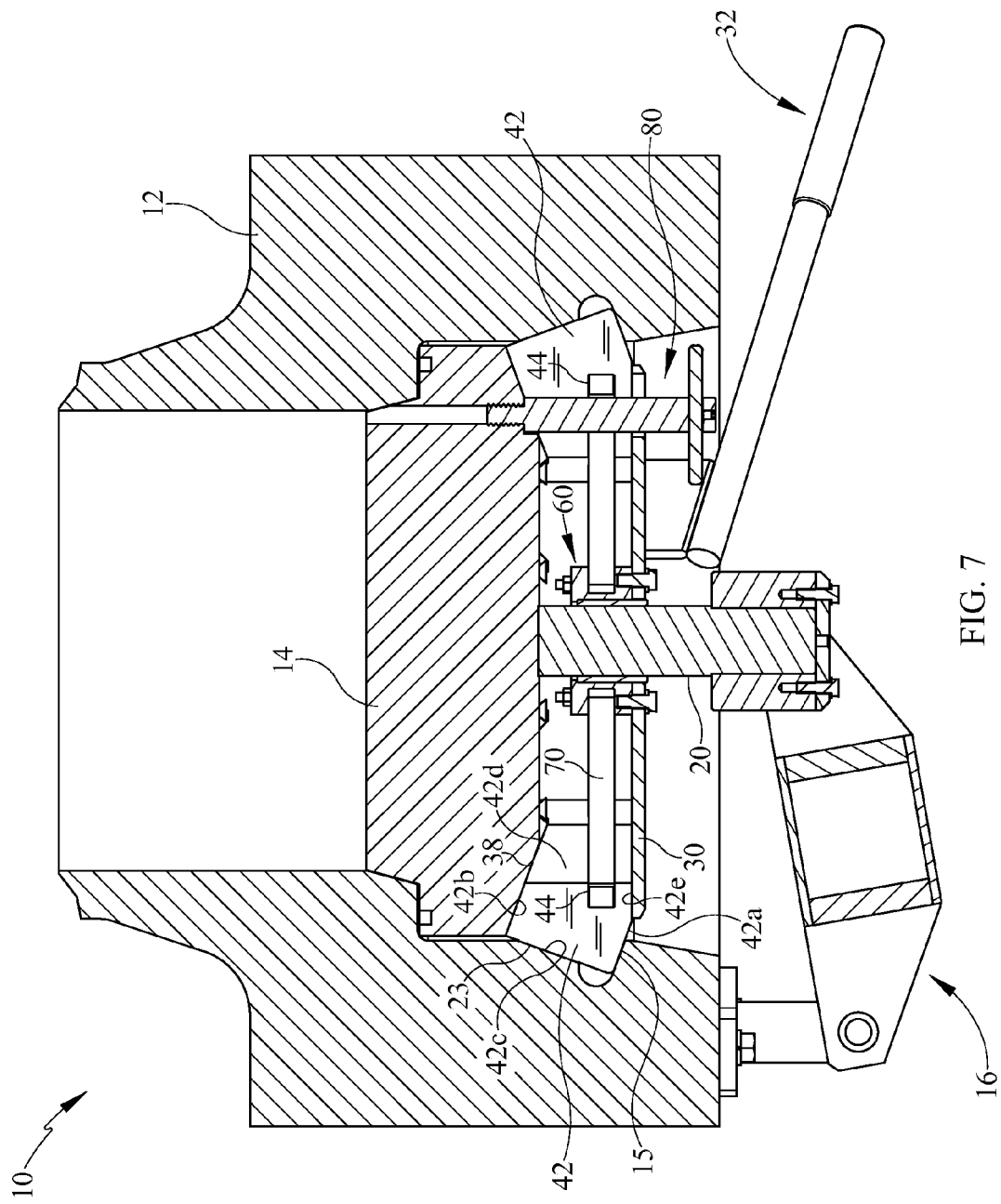
FIG. 7 is a sectional view of the closure in a closed position with the locking ring segments engaging the hub and the head.

Referring now to FIG. 7, a section view of the closure 10 is depicted. The radial arms 70 extend between the spool 60 and the locking ring segments 42. Each radial arm 70 extends into the groove 44 so that the radial arms 70 pivot at both the spool 60 and the locking ring segment 42. In this configuration, the locking ring segments 42 maintain the closure in the locked position.

The locking ring assembly 40, including the plurality of segments 42, is seated on the tapered head bearing surface 38 of the head 14 for radial expansion and collapse. Each of the locking ring segments 42 is defined by polygonal cross-section, including two parallel sides 42a, 42b. One of the sides 42b is seated against the tapered surface 38, while the opposite parallel surface 42a is seated against a first bearing surface 15 of the hub 12. A substantially perpendicular surface 42c extends between the two parallel surfaces and engages a second bearing surface 23 of the hub 12. The first bearing surface 15 is substantially parallel to head surface 38 and segment surface 42a. The second bearing surface 23 is generally perpendicular to the surface 15 and is at an angle to the axis of the closure 10. The angle may be about 10 degrees to about 25 degrees. More preferably the angle may be about 15 degrees and even more preferably the angle may be about 20 degrees. A radially innermost surface 42d of the locking ring segments 42 is oriented at an angle so as to be co-axial with the hub 12 and allow a circumferential groove 44 to be formed in each segment. A connecting surface 42e is disposed between the radial innermost surface and one of the parallel surfaces 42a. The connecting surface 42e seats each segment 42 against the cover plate 30. Thus as described before, the segment 42 can move by way of the keys 50 along the tapered surface 38 and by axial movement of the spool 60 and are retained against the tapered surface 38 against the cover plate 30. Effectively, portions of the segments 42, above groove 44, are sandwiched between the cover plate 30 and tapered surface 38 with radial arm 70 to control movement of the segment.

Also shown in the section view of FIG. 7 is a pressure safety device 80. The device 80 interlocks with the locking ring assembly 40 so that when the device 80 is in position, the radial arm 70 may not be retracted by rotating the spool 60. The safety device 80 extends through a notch or hole 31 (FIG. 3) in the cover 30.

Figure 8:
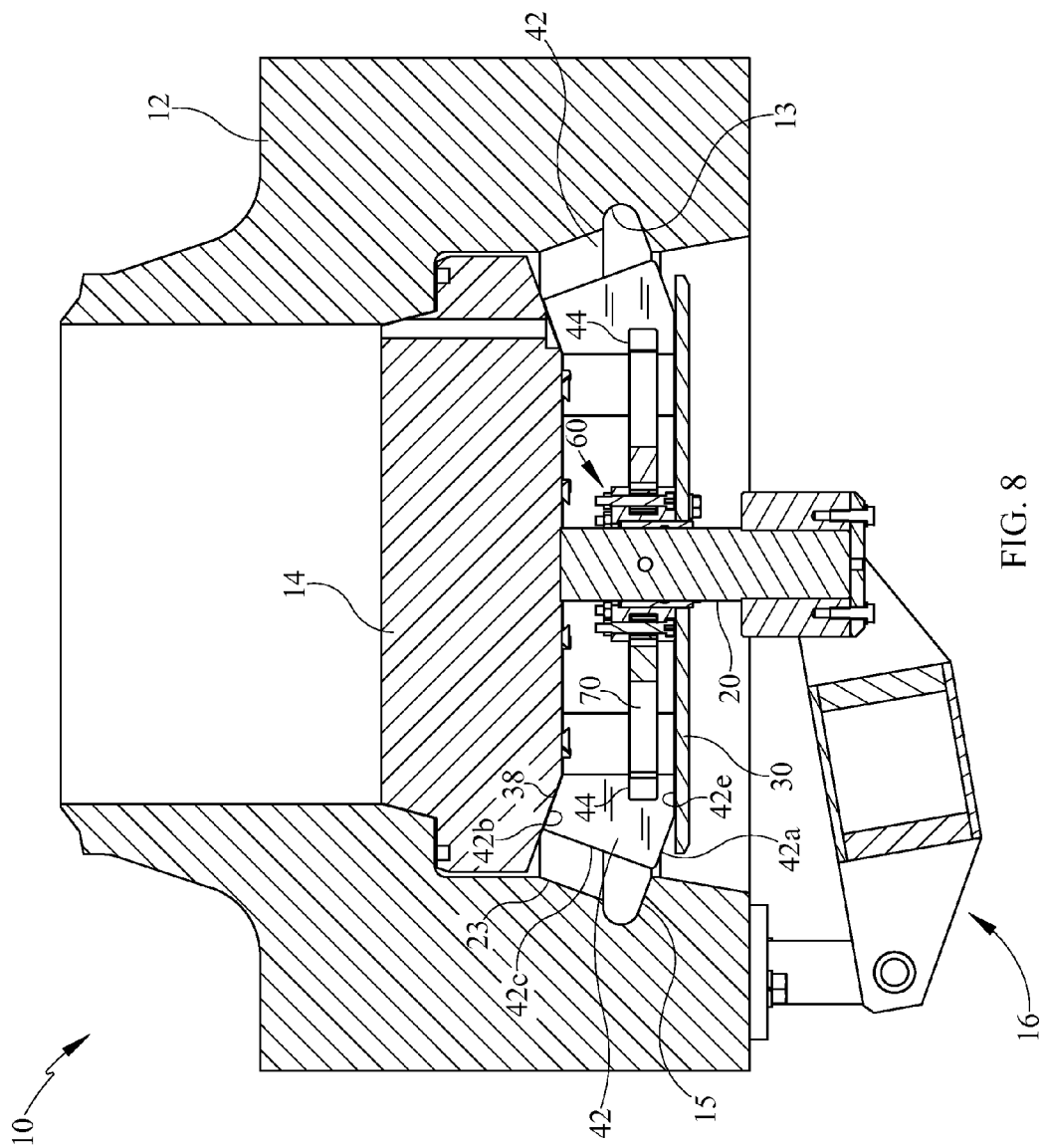
FIG. 8 is a sectional view of the closure in a closed position with the locking ring segments disengaged from the head.

Referring now to FIG. 8, a section view of the closure 10 is shown. The closure 10 has locking segments 42 shown in the retracted position. In the position depicted, the segments 42 are removed from the annular groove, so that the closure 10 is available for opening.

Figure 9:
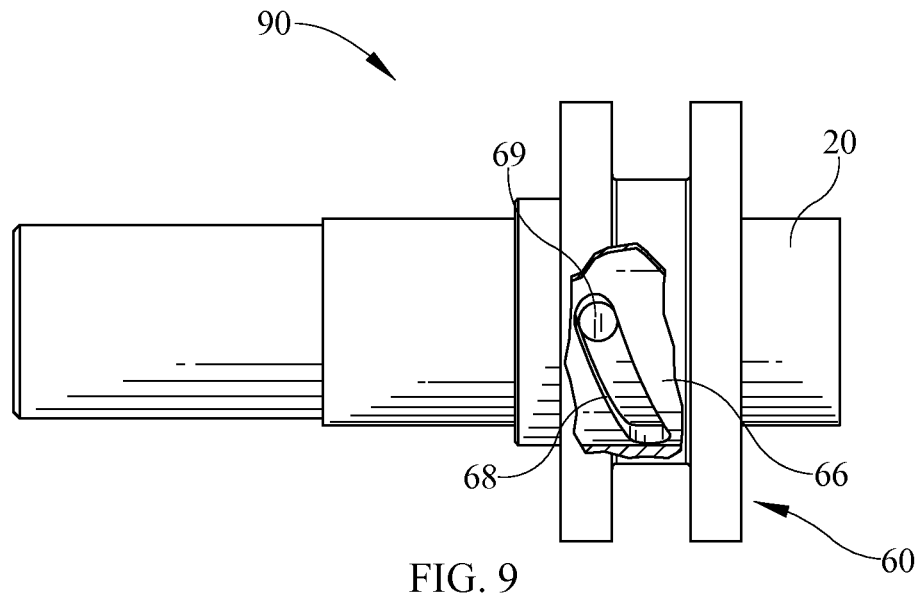
FIG. 9 is a side view of the locking ring actuator with a cut away view depicting the splined area bushing.

Referring now to FIG. 9, a side view of the locking ring actuator 90 is depicted in side view with a cutaway portion. The actuator 90 includes the post 20 and the spool 60 with the bushing 66 disposed within the spool 60. Both the spool 60 and the bushing 66 are coaxial with the post 20 which includes a pin 69 depending therethrough and engaging the groove 68 in the bushing 66. The groove 68, which may be continuous or discontinuous, has a preselected pitch, which may be variable or consistent, so that rotation of the spool 60 and bushing 66 results in axial movement of the spool 60 and bushing 66. The radial arms 70 are removed from this view for clarity.

Figure 10:
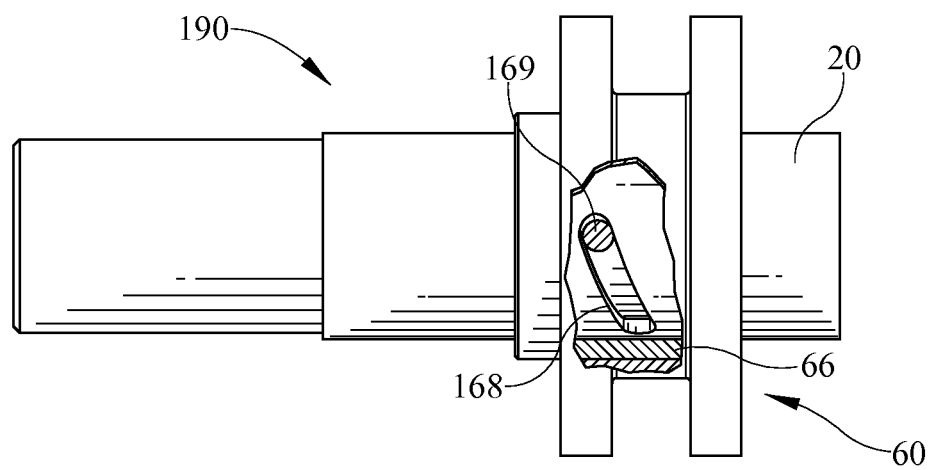
FIG. 10 is a side view of an alternative locking ring actuator with a cut away view.

Referring now to FIG. 10, an alternate embodiment of the locking ring actuator 190 is depicted. The instant embodiment includes the post 20, spool 60 and the bushing 66. In this alternate embodiment, the groove 168 is positioned in the post 20 and the pin 169 extends from the bushing 66. As previously described, the groove 168 may be continuous or interrupted, and may have a consistent or variable pitch. Additionally, one skilled in the art should understand that the bushing 66 and spool 60 may be integrally formed and therefore according to this embodiment the pin 169 may extend solely from an alternative integral spool structure into the groove 168 formed in the post 20.

Figure 11:
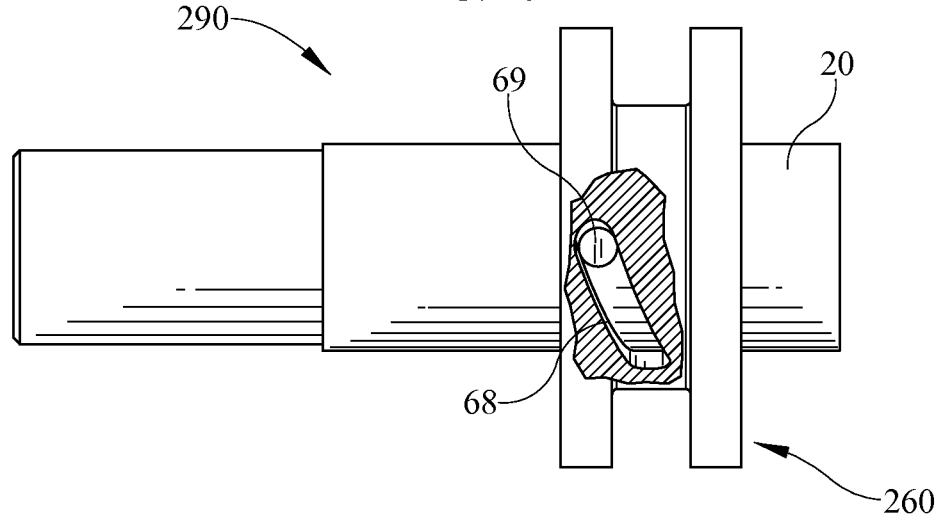
FIG. 11 is a side view of a further alternative locking ring actuator with a cut away view.

Referring now to FIG. 11, a side view of an alternate locking ring actuator 290 is depicted. The embodiment includes the post 20 which has a pin 69 extending therethrough. The spool 260 is integrally formed with the bushing or similar structure and includes a groove 68 therein. Thus the spool 260 is engaged by the pin 69 to cause axial movement of the spool 160 with rotation of the spool.

Although the closure 10 is depicted for mounting in an orientation wherein the axis of the hub is generally horizontal, it should be understood that the closure may be positioned such that the axis of the closure 10 is vertical. Further, the closure 10 has benefits over the prior art such as fewer moving parts, which results in more reliable operation. The opening and closing may occur by way of use of the single lever or handle 32 throughout a relatively small range of motion, for example less than 65 degrees. This provides that a user does not have to maintain high force over a long distance, which may result in difficulty in opening.

Figure 12:
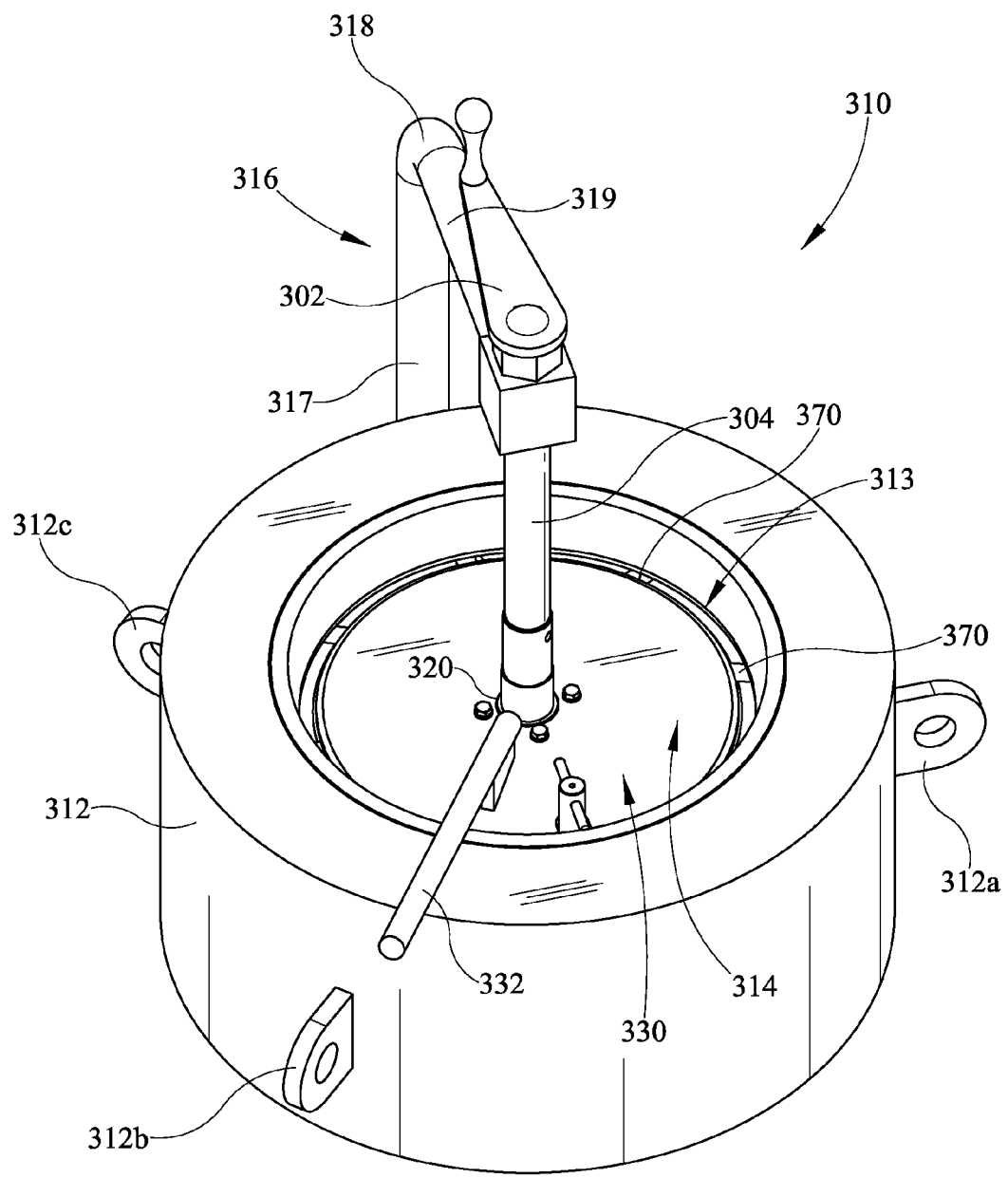
FIG. 12 is a perspective view of an alternative embodiment for a vertical mount closure.

Referring now to FIG. 12, a perspective view of an alternative closure embodiment 310 is depicted. The closure 310 differs from the alternate embodiments previously discussed in that the instant closure is mounted in a vertical configuration meaning the opening of the closure is facing upward or vertically or has a surface in a substantially horizontal plane. In this embodiment, the closure 310 does not utilize a hinge structure as previously provided in other embodiments to open the closure.

The closure 310 includes a hub 312 having a central bore or opening 313. The operation of the locking and unlocking mechanisms of the closure 310 are similar to those previously described. Summarily, an actuator utilizes a spline that rotates with the cover 330 and the spline moves axially as locking segments (not shown) retract from engagement with the hub 312. Within the central opening 313 is a head 314. The actuator utilizes arms which move locking segments in a radial direction into and out of engagement with the hub 312.

Positioned above the head 314 is a cover 330. The cover 330 hides the locking segments and arms 370 and rotation of the cover 330 causes movement of the locking arms and radial movement of the locking segments as previously described. A post 320 extends from the cover 330 and provides a pivot axis for the actuator positioned therebelow. As noted before, rotation of the cover 330 causes movement of the actuator mechanism to move the locking segments into and out of engagement with the hub 312. A handle 332 is connected to the cover 330 to provide a means to move the cover wherein such movement causes axial and rotational movement of a spool relative to the post 320.

A plurality of lugs are disposed about the outer perimeter of the hub 312. The lugs 312a, 312b and 312c allow for easy lifting of the hub 312 or the closure assembly 310 for positioning on a vertically extending pipe or extension of a vessel. Once in position, the surface of the cover 330 lies in a generally horizontal plane and the opening 313 is disposed in a horizontal plane as well.

The embodiment further comprises a davit 316. The davit 316 provides mechanical force through an input handle or crack to lift or lower the head 314. The davit includes a vertically extending post 317, a curved shoulder 318 and an arm 319 which extends horizontally over the head 314 of the closure 310. The curved shoulder 318 allows pivoting of arm 319 about the vertical axis of the post 317. An end of the arm 319 includes a crank assembly 302 which is rotatable to either lift or lower the head 314. An axial strut 304 is connected to the crank assembly 302 and may be connected by fastener or permanently connection, for example by welding, or integrally formed with, to the head 314. Thus when the crank or handle assembly 302 rotates, the strut 304 raises or lowers the head. Similarly, the davit 316 may be utilized to lower the head 314 into the hub 312 as desired.

Figure 13:
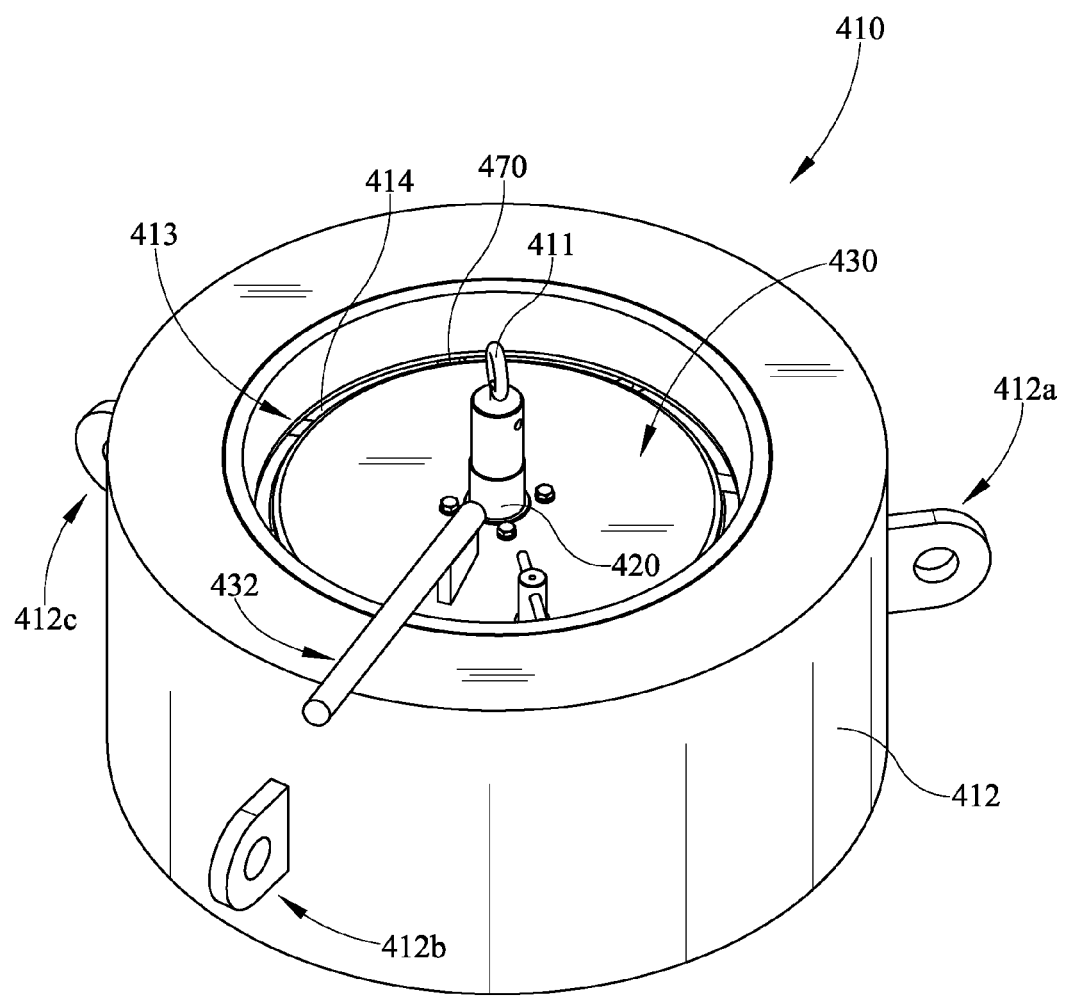
FIG. 13 is an embodiment of the closure of FIG. 12 with a davit for removing the head of the closure.

Referring now to FIG. 13, a perspective view of an alternate closure 410 is depicted also for use in a vertical orientation but having the davit removed. Extending from the post 420 is a lifting eyebolt 411. The lifting eyebolt 411 allows connection of various lifting devices such as hoists or platform cranes or the like to the head 414. The lifting eye 411 may be utilized to lift the head 414 from within the central opening 413 when the actuation process occurs utilizing handle 432 and the locking mechanisms are disengaged. Although an eyebolt is depicted various other structures may be utilized to provide the lifting functionality. Further a plurality of lifting eyes 412a are dispose about the hub 412. As in the previous embodiment this embodiment may also utilize a cover 430 beneath which are a plurality of arms 470.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A closure for pressurized system or vessel, comprising:
a hub having a generally cylindrical shape with a central opening;
a head positionable within said central opening of said hub and removable from said central opening of said hub;
a davit operably engaging said head to at least one of lift and lower said head from within said central opening;
a central post extending from said head;
a spool having a plurality of arms extending from said spool, said spool rotatably positioned about said post;
said radial arms pivotally connected to said spool and pivotally connected to a locking ring segment, said locking ring segment having a recess for pivotally receiving said radial arm;
said spool and said post operably engaged wherein pivotal motion of said spool causes said spool to move axially along said post;
said locking ring segment and said head having tapered surfaces allowing axial movement of said locking ring segment along said head with said axial movement of said spool.

2. The closure of claim 1, further comprising a pin extending through said post.

3. The closure of claim 2, further comprising a spline on one of a bushing or spool engaging said pin.

4. The closure of claim 1 further wherein one of said spool and said post has a thread and the other of said spool and said post has a cooperating feature.

5. The closure of claim 1 further comprising a pin extending from a spool and engaging a spline in said central post.

6. The closure of claim 1 wherein a guide having at least two pieces, one of said two guide pieces disposed on said locking ring segment, the other of said two guide pieces disposed on said head.

7. The closure of claim 6 wherein one of said two guide pieces is a key and the other of said two guide pieces is a keyway.

8. The closure of claim 7 wherein said key and said keyway constrains said locking ring segment to radial movement.

9. The closure of claim 1, said head having a tapered surface near a radially outward edge.

10. The closure of claim 9 wherein said locking ring segments move axially.

11. The closure of claim 9 further comprising a fastener aperture on a flat surface of said head.

12. The closure of claim 9 further comprising a fastener aperture on said tapered surface of said head.

13. The closure of claim 1 further comprising a cover plate connected to said spool wherein pivoting of said cover plate causes rotation of said spool.

14. The closure of claim 13 further comprising a handle connected to said cover plate.

15. A closure for a pressurized system or aperture, comprising:
- a hub having a central opening and a head positionable within said central opening of said hub said head having a tapered surface near said peripheral edge;
- a davit operably engaging said head to move said head relative to said hub;
- a post extending from said head and a spool movably positioned on said post, said spool rotatably movable on said post and movable axially along said post toward or away from said head;
- a plurality of radial arms having a first end and a second end, said radial arms extending radially in a first position and non-radially in a second position;
- a plurality of locking segments positioned on said head for slidable guided movement along said head, said plurality of locking segments being positioned radially extended in said first position and radially retracted in said second position;
- rotation of said spool causing said spool to move a preselected axial distance between said first position and said second position, said rotation of said spool causing both radial and axial movement of said locking segments.

16. The closure of claim 15, said locking segments having one of a key and a keyway.

17. The closure of claim 16, said head having the other of a key and a keyway.

18. The closure of claim 15 further comprising a cover plate over said spool and said radial arms.

19. The closure of claim 18, said cover plate is movable in said axial direction of said post.

20. The closure of claim 15 further comprising a spline on one of said spool or said post.

21. The closure of claim 20, said spline being variable pitch.

22. A closure comprising:
- a hub with a central opening and a head moveable into or out of said hub, said head sealing said central opening when in a closed position;
- a davit connected to said head to one of lift or lower said head relative to said central opening of said hub;
- a spool rotatable about a post extending from said head, wherein rotation of said spool causes axial movement of said spool along said post;
- a cover plate engaging said spool wherein rotation of said cover plate causes rotation of said spool;
- a plurality of radial arms extending from said spool to a plurality of locking segments;
- said locking segments being guided to move axially and radially along said head to engage or disengage said hub.

* * * * *